UNITED STATES PATENT OFFICE.

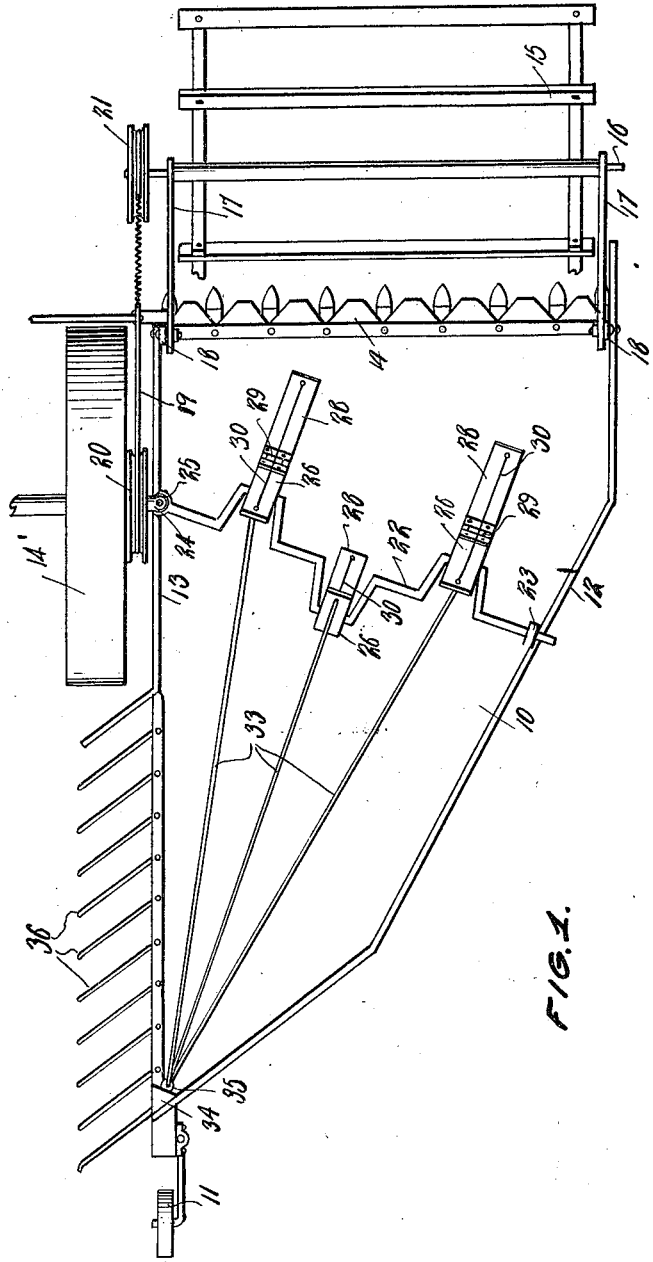

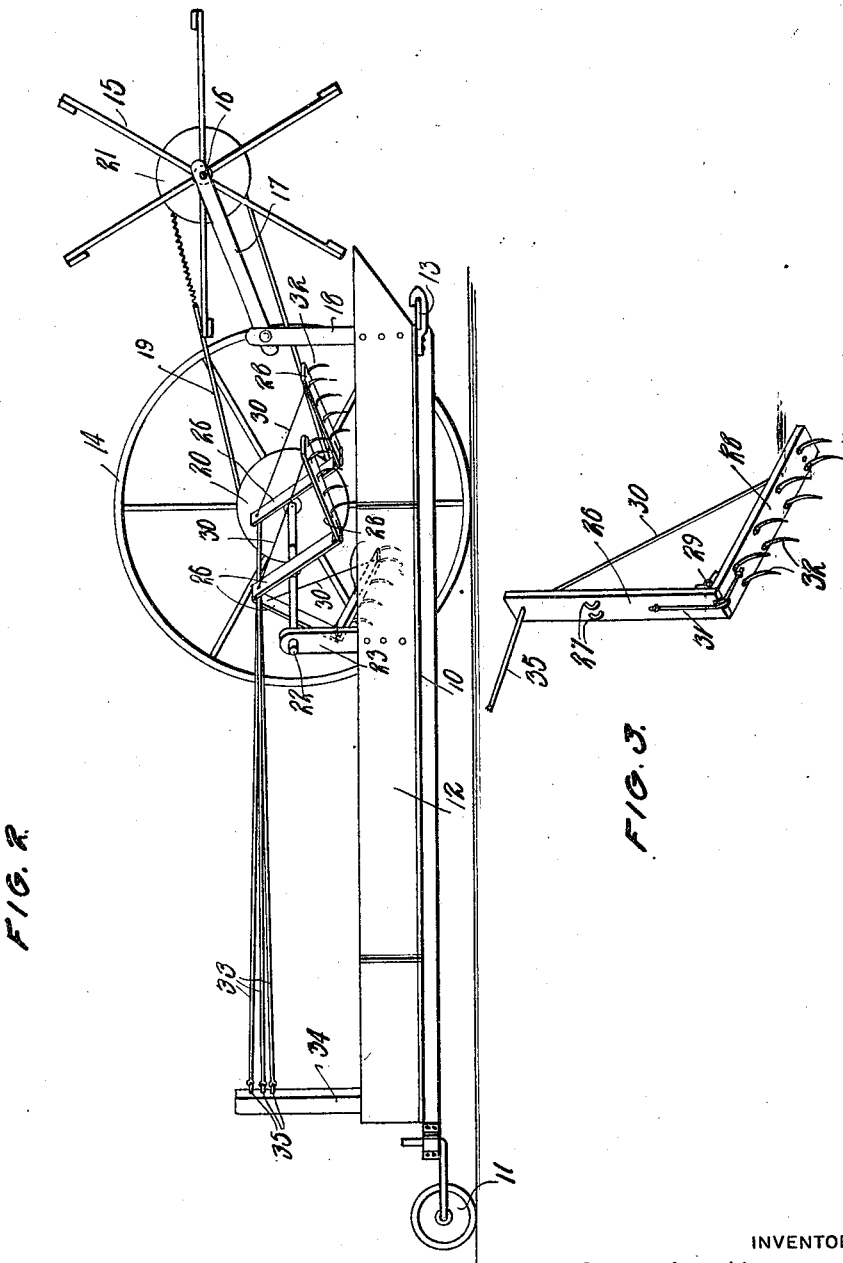

ALBERT O. HANSON, OF OPHEIM, MONTANA.

FLAX-HARVESTER.

1,311,347. Specification of Letters Patent. Patented July 29, 1919.

Application filed December 15, 1917. Serial No. 207,336.

*To all whom it may concern:*

Be it known that I, ALBERT O. HANSON, a citizen of the United States, residing at Opheim, in the county of Valley and State of Montana, have invented certain new and useful Improvements in Flax-Harvesters, of which the following is a specification.

This invention relates to an improved flax harvester and the principal object of the invention is to provide an improved harvester for flax, the harvester being so constructed that it may be used in connection with a mowing machine of a conventional construction, and to further so construct this machine or mowing machine attachment that the flax cut by the mowing machine may be collected and deposited in a row along a field.

Another object of the invention is to so construct this attachment that it may be driven from the supporting wheel of the mowing machine and positioned to the rear of the sickle bar.

Another object of the invention is to so construct this machine that both tall and short flax may be cut and collected.

Another object of the invention is to provide an improved type of collecting mechanism for engaging the cut flax dropping upon the platform of the machine and moving this flax toward the rear end thereof.

This invention is illustrated in the accompanying drawings, wherein:—

Figure 1 is a top plan view of the improved machine shown in position for use,

Fig. 2 is a side elevation of the improved machine,

Fig. 3 is a perspective view of one of the flax engaging arms.

This improved machine is provided with a platform or body 10 supported at its rear end by a caster 11 and provided with side walls 12 and 13. The forward end portions of the platform will be connected with the sickle bar 14 of a conventional form of mowing machine and it will thus be seen that this platform will be positioned to the rear of the sickle bar and to one side of the supporting wheel 14' of the mowing machine. A drum or beater 15 is positioned forward of the sickle bar 14 and has its shaft 16 rotatably supported by the bearing arms or supporting arms 17 which arms are connected with the upper ends of the standards 18 carried by the side walls 12 and 13. By adjusting the angle of the arms 17, the drum or beater may be held at the desired height above the ground for proper engagement with the flax to be cut. This drum will be rotated through the medium of a belt 19 which passes around the pulley wheels 20 and 21, the pulley wheel 20 being connected with the supporting wheel of the machine thus providing a driving means for the drum 15.

A crank shaft 22 extends transversely of the platform and has one end portion rotatably mounted by the bearing 23 and has its opposite or inner end portion connected with the stub shaft 24 of the universal joint 25. This stub shaft 24 is carried by the pulley wheel 20 and it will thus be seen that as the wheel 14' rotates, the crank shaft 22 will be rotated. Forks shown in Fig. 3 are provided to engage the flax which drops upon the platform 10 and are provided with upper sections 26 connected with the crank extensions of the crank shaft 22 by eyes 27 and lower sections 28 hingedly connected with the upper sections by hinges 29 and limited in their movement by the lines 30. Springs 31 are provided to yieldably hold the lower sections as shown in Figs. 2 and 3 although the lines 30 limit the swinging movement of the lower sections. These lower sections are provided with teeth 32 which will engage the flax and move the flax rearwardly across the platform until the forks are swung upwardly by rotation of the crank shaft. In order to guide movement of the forks as the crank shaft rotates, there has been provided guiding rods 33 pivotally connected with the standard or post 34 by eyes 35 and having their forward ends loosely connected with the upper sections 26 of the forks. It will thus be seen that as the crank shaft rotates, the upper sections will be rocked upon the crank arms and when the lower sections engage the platform, they will move at the hinges and thus be drawn rearwardly along the platform. As the shaft rotates to swing the crank extensions upwardly, the springs 31 will cause the lower sections to have a tendency to move away from the upper ends of the upper sections thus causing these lower fork sections to assume the position shown in Fig. 2 when the forks are in a raised position and moving forwardly and downwardly to again engage the platform. The flax falling upon the platform will be engaged by the forks and be moved rearwardly across the platform and will pass from the platform across the teeth 36 where it will drop upon the ground and be deposited in a row across the field. It will thus be seen that with this machine, the short flax as well as tall flax will be gathered and thus waste prevented.

I have therefore provided a machine for cutting flax which will be very efficient in operation and have further provided a machine so constructed that it may be connected with mowing machines of a conventional construction thus permitting the machine to be sold as a separate article for connection with mowing machines already in use. It will be further noted that the machine is so constructed that it may be readily connected with a mowing machine thus permitting the mowing machine to be used with the connection connected thereto when cutting flax or with the attachment removed when cutting hay.

What is claimed is:—

1. An attachment for a mowing machine comprising a platform, a crank shaft extending transversely above the platform, rake elements having upper sections loosely connected with the crank extensions of the crankshaft, and lower sections pivotally connected with the upper sections, resilient means yieldably holding the lower sections against swinging movement in one direction, flexible means limiting swinging movement of the lower sections in the opposite direction, a standard carried by the platform, and rods loosely connected with the standard and with the upper sections above the crank shaft to guide the movement of the rake elements as the crank shaft rotates.

2. An attachment for mowing machines comprising a platform, a crank shaft extending transversely above the platform, rake elements having upper sections loosely connected with the crank extensions of the shaft and lower sections pivotally connected with the upper sections, means yieldably holding the lower sections against movement in one direction, means limiting swinging movement of the lower sections in the opposite direction, a standard carried by the platform, and rods loosely connected with the standards and with the upper sections of the crank shaft, to guide the movement of the rake elements as the crank shaft rotates.

3. An attachment for mowing machines comprising a platform, a crank shaft extending transversely above the platform, rake elements having upper sections loosely connected with the crank extensions of the crank shaft, and lower sections pivotally connected with the upper sections, resilient means yieldably holding the lower sections against swinging in one direction, flexible means limiting swinging movement of the lower sections in the opposite direction, and means for guiding the movement of the rake elements as the crank shaft rotates.

4. An attachment for mowing machines comprising a platform, a crank shaft extending transversely above the platform, rake elements having upper sections loosely connected with the crank extensions of the crank shaft, and lower sections pivotally connected to the upper sections, means yieldably holding the lower sections against swinging in one direction, means limiting swinging movement of the lower sections in opposite direction, and means to guide the movement of the rake elements as the crank shaft rotates.

In testimony whereof I affix my signature in presence of two witnesses.

ALBERT O. HANSON.

Witnesses:
 SIG B. HOLMES,
 A. T. OLSON.

Copies of this patent may be obtained for five cents each, by addressing the "Commissioner of Patents, Washington, D. C."